United States Patent [19]

Jaux

[11] Patent Number: 5,196,728
[45] Date of Patent: Mar. 23, 1993

[54] METHOD OF CONTROLLING A NETWORK OF ELECTRONIC STATIONS INCLUDING A SLEEP MODE WHEN NO ACTIVE FUNCTION IS ACTIVATED

[75] Inventor: Tony Jaux, Vincennes, France

[73] Assignee: Jaeger, France

[21] Appl. No.: 629,137

[22] Filed: Dec. 18, 1990

[30] Foreign Application Priority Data

Dec. 19, 1989 [FR] France ............... 89 16805
Dec. 19, 1989 [FR] France ............... 89 16806

[51] Int. Cl.⁵ .............................. G06F 1/32
[52] U.S. Cl. .............................. 307/10.1; 364/273.2;
364/707; 395/375; 395/200
[58] Field of Search ............... 307/31, 10.1, 38–40,
307/116; 364/707, 200 MS File, 900 MS File,
424.05; 455/343; 340/286.02

[56] References Cited

U.S. PATENT DOCUMENTS

| | | | |
|---|---|---|---|
| 4,698,748 | 10/1987 | Juzwik et al. | 364/200 |
| 4,851,987 | 7/1989 | Day | 364/200 |
| 4,987,317 | 1/1991 | Pournain et al. | 307/40 |

FOREIGN PATENT DOCUMENTS

| | | |
|---|---|---|
| 0138735 | 4/1985 | European Pat. Off. . |
| 0276082 | 7/1988 | European Pat. Off. . |
| 2445769 | 1/1980 | France . |
| 2626998 | 8/1989 | France . |

Primary Examiner—A. D. Pellinen
Assistant Examiner—David A. Osborn
Attorney, Agent, or Firm—Blakely, Sokoloff, Taylor & Zafman

[57] ABSTRACT

The present invention relates to a method of controlling a network of electronic stations each suitable for generating at least one function, in particular for use on a motor vehicle. The method comprises the following steps: i) generating an activation signal in at least some of the stations when a previously inactive function is requested; ii) generating a deactivation signal when an associated previously active function is to be deactivated; iii) detecting the generated activation and deactivation signals; iv) incrementing at least one counter by one step each time an associated activation signal is detected; v) decrementing the same counter by one step each time an associated deactivation signal is detected; and vi) generating a "go to sleep" signal when a counter reaches a zero count after being decremented.

26 Claims, 4 Drawing Sheets

METHOD OF CONTROLLING A NETWORK OF ELECTRONIC STATIONS INCLUDING A SLEEP MODE WHEN NO ACTIVE FUNCTION IS ACTIVATED

The present invention relates to a method of controlling a network of electronic stations, and to the resulting network.

The invention is particularly applicable to networks of electronic stations in motor vehicles.

BACKGROUND OF THE INVENTION

Modern motor vehicles are fitted with numerous electronic stations or functions, some of which must be capable of being active when the engine is stopped. By way of example, mention may be made of controlling lighting, fog lights, windscreen wipers, monitoring liquid levels, temperature levels, speed, ABS functions, suspension controlling functions, and functions that must be capable of remaining active when the engine is stopped: door control functions, warning light functions, alarm systems.

The introduction of electronics into the automobile industry has led the ISO to propose a limit of 1 mA on electricity consumption when the engine is not operating, for the purpose of avoiding premature discharge of the vehicle battery.

Given the state of the art, it would appear to be difficult to satisfy this condition while keeping all of the electronic stations or functions switched on.

Proposals have therefore been made to switch off power supply to at least some of these stations when the engine is stopped.

More precisely, proposals have been made to design electronic stations capable of occupying two different operating modes or states: an active mode in which all of the means of the station required for performing a function are in operation, and a dormant mode in which the only portion of the station that remains in operation is the portion required for "waking it up".

These proposals constitute the subject matter of literature which is already fairly abundant.

By way of example, the following documents may be mentioned: FR-A-2508257, FR-A-2578070, FR-A-2626998, FR-A-2627036, FR-A-2627038, FR-A-2627039, and GB-A-2172727.

However, prior proposals do not give full satisfaction.

A particular object of the present invention is to provide a method of controlling a network of electronic stations which enables stations to switch between active mode and dormant mode under optimum conditions.

SUMMARY OF THE INVENTION

According to the invention, this object is achieved by a method of controlling a network of electronic stations each suitable for generating at least one function, in particular for motor vehicles, the method comprising the following steps:

i) generating an activation signal at at least one of the stations when a request is made for a previously inactive function;

ii) generating a deactivation signal at the same station when a previously active function is to be deactivated;

iii) detecting the generated activation and deactivation signals;

iv) incrementing at least one counter by one step each time an activation signal associated with the counter is detected;

v) decrementing the same counter by one step each time an associated deactivation signal is detected; and vi) generating a "go to sleep" signal whenever a counter reaches a zero count on being decremented.

In a first implementation of the present invention, for use in a network of electronic stations each of which is suitable for generating at least one function and in which at least some of these functions are "wake-up" functions, the method consists in the following steps:

a) at at least some of the stations:

i) generating an activation signal when a previously inactive "wake-up" function is requested;

ii) generating a deactivation signal when an associated and previously active "wake-up" function is to be deactivated;

b) at at least one control station including a counter:

i) detecting the activation and deactivation signals generated by all of the stations;

ii) incrementing the counter by one step each time a activation signal is detected;

iii) decrementing the same counter by one step each time a deactivation signal is detected; and iv) generating a "go to sleep" signal for all of the stations when the counter reaches a count of zero on being decremented.

In the context of the present application, the term "wake up" function is used to designate any function that must be capable of being activated even when the ignition key is in the off position. By way of example, warning light functions and door locking functions constitute "wake-up" functions.

According to another advantageous characteristic of the first implementation of the present invention, only one control station in the network includes a counter.

According to another advantageous feature of the first implementation of the present invention, at least some of the electronic stations of the network are designed to generate at least one "wake-up" function of a first type which is of unlimited duration and which requires an operator to activate it and an operator to deactivate it, and at least some of the electronic stations of the network are designed to generate at least one "wake-up" function of a second type which is of limited duration and which requires an operator to activate it but which is designed to be deactivated automatically, the method then comprising the following steps:

a) at at least some of the stations;

i) generating an activation signal of a first type when an associated and previously inactive unlimited duration "wake-up" function of the first type is requested by the operator;

ii) generating a deactivation signal when an associated and previously active "wake-up" function of the first type is to be deactivated;

iii) generating an activation signal of a second type when an associated and previously inactive limited duration "wake-up" function of the second type is requested by the operator;

b) and at at least one control station including a counter and a timer:

i) detecting the activation and deactivation signals generated by all of the stations;

ii) incrementing the counter by one step each time an activation signal of the first type is detected;

iii) decrementing the same counter by one step each time a deactivation signal is detected;

iv) initializing the timer each time an activation signal of the second type is detected; and v) generating a "go to sleep" signal for all of the stations when the counter reaches a count of zero and simultaneously the timer is not timing.

In a second implementation of the present invention, the method comprises the following steps which consist, at each station, in:

i) generating an activation signal when a previously inactive function of the station is requested;

ii) generating a deactivation signal when a previously active function of the station is to be deactivated;

iii) detecting the activation and deactivation signals generated by said station;

iv) incrementing a counter incorporated in the station by one step each time an activation signal generated by said station is detected;

v) decrementing the same counter by one step each time a deactivation signal generated by said station is detected; and vi) generating a "go to sleep" signal for said station when the counter reaches a count of zero on being decremented.

Advantageously, in this second implementation of the present invention, at least some of the electronic stations in the network are defined to generate at least one function of a first type which is of unlimited duration and which requires an operator to activate it and an operator to deactivate it, and at least one function of a second type which is of limited duration and which requires an operator to activate it, but which is designed to be deactivated automatically, the method comprising the following steps which consist at each of the stations in:

generating an activation signal of a first type when a previously inactive unlimited duration function of the first type of the station is requested by the operator;

generating a deactivation signal when a previously active function of the first type of said station is to be deactivated;

generating an activation signal of a second type when a previously inactive limited duration function of the second type of said station is requested by the operator;

detecting the activation and deactivation signals generated by said station;

incrementing the counter incorporated in said station by one step each time an activation signal of the first type generated by said station is detected;

decrementing the same counter by one step each time a deactivation signal generated by said station is detected;

initializing a timer incorporated in said station each time an activation signal of the second type generated by said station is detected; and generating a "go to sleep" signal for said station whenever the counter reaches a count of zero and simultaneously the timer is not timing.

The present invention also provides a network of electronic stations each capable of generating at least one function, in particular for motor vehicles, the network comprising:

means suitable for generating an activation signal when an associated and previously inactive function is requested;

means suitable for generating a deactivation signal when an associated and previously active function is to be deactivated;

means suitable for detecting the generated activation and deactivation signals;

a counter designed to be incremented by one step each time an associated activation signal is detected and to be decremented by one step each time an associated deactivation signal is detected; and means suitable for generating a "go to sleep" signal each time a counter reaches a zero count on being decremented.

More precisely, in this first embodiment of a network of electronic stations each suitable for generating at least one function, in which at least some of these functions are "wake-up" functions, the network comprises:

a) at at least some of the stations:

means suitable for generating an activation signal when an associated and previously inactive "wake-up" function is requested;

means suitable for generating a deactivation signal when an associated and previously active "wake-up" function is to be deactivated;

b) at at least one control station:

means suitable for detecting the activation and deactivation signals generated by all of the stations;

a counter designed to be incremented by one step each time an activation signal is detected and to be decremented by one step each time a deactivation signal is detected; and means suitable for generating a "go to sleep" signal for all of the stations when the counter reaches a zero count on being decremented.

In the second embodiment, the network of electronic stations each suitable for generating at least one function comprises, in each station:

means suitable for generating an activation signal when a previously inactive function of the station is requested;

means suitable for generating a deactivation signal when a previously active function of said station is to be deactivated;

means designed to detect the activation and deactivation signals generated by said station;

a counter designed to be incremented by one step each time an activation signal is detected and to be decremented by one step each time a deactivation signal is detected; and means suitable for generating a "go to sleep" signal for said station whenever the counter reaches a zero state after being decremented.

BRIEF DESCRIPTION OF THE DRAWINGS

Embodiments of the invention are described by way of example with reference to the accompanying drawings, in which:

FIG. 5b shows a variant of the first embodiment according to the present invention comprising an additional control timer; and FIG. 6b shows a variant of the second embodiment according to the present invention comprising an additional control timer.

MORE DETAILED DESCRIPTION

The following description begins with the general structure of a network of stations in accordance with the present invention, followed by the general structure of each station, a local "wake-up" process, a remote "wake-up" process, and the processes of the present invention whereby the stations are "put to sleep".

GENERAL STRUCTURE OF THE NETWORK

Figure 1:
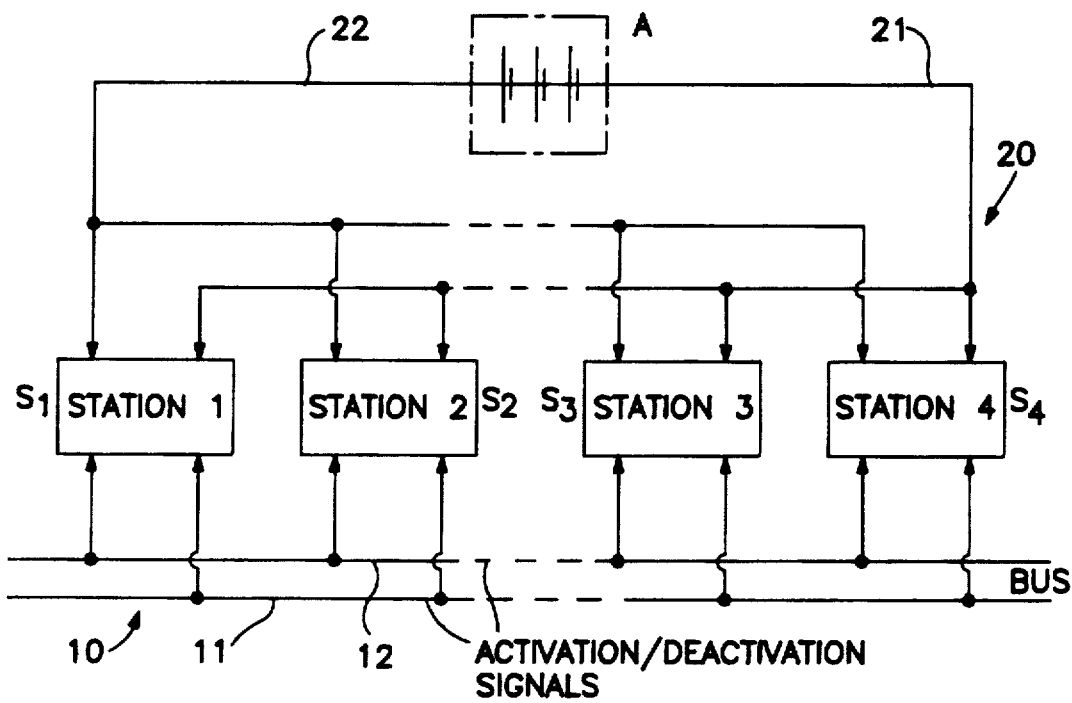
FIG. 1 is a block diagram of a network of stations in accordance with the present invention.

As shown diagrammatically in accompanying FIG. 1, a network of the present invention comprises a plurality of electronic stations S1, S2, S3, S4 (FIG. 1 shows four stations, but this number is not limiting).

The stations S1 to S4 are interconnected by a communications bus 10. It is preferably a bus having two wires 11 and 12.

One of the essential roles of the bus 10 is to transmit appropriate "wake up" or "go to sleep" instructions to the various stations S1 to S4. However, the bus 10 may also be used for transmitting any information signals between the various stations S1 to S4 as may be required for proper operation of the network.

The bus 10 may be constituted by electric wires. Alternatively, the bus 10 may be constituted by optical fibers or by any other equivalent means.

The stations S1 to S4 are powered by the battery A of a motor vehicle via a two-wire network 20 having wires 21 and 22. The configuration of the power network 20 is preferably a star configuration.

Each of the stations S1 to S4 can take up two states: a dormant state and an active state.

In the active state all of the electronic means in a station required for implementing a function are in operation, whereas in the dormant state, only the means required for enabling the station to be "woken up" remain in operation, as mentioned above.

The active state itself comprises two sub-states depending on whether or not the function associated with the station is activated or not activated.

In the context of the present application, the term "wake up" process is used to designate the process of changing the state of the station from its dormant state to its active state. Similarly, the term "putting to sleep" is used to designate a process for switching a station from its active state to its dormant state.

The various stations S1 to S4 are preferably identical in structure.

Each station S1 to S4 may be designed to generate a plurality of functions. However this disposition is not limiting, i.e. it is perfectly possible for each station S1 to S4 to generate one function only.

STRUCTURE OF A STATION

Figure 2:
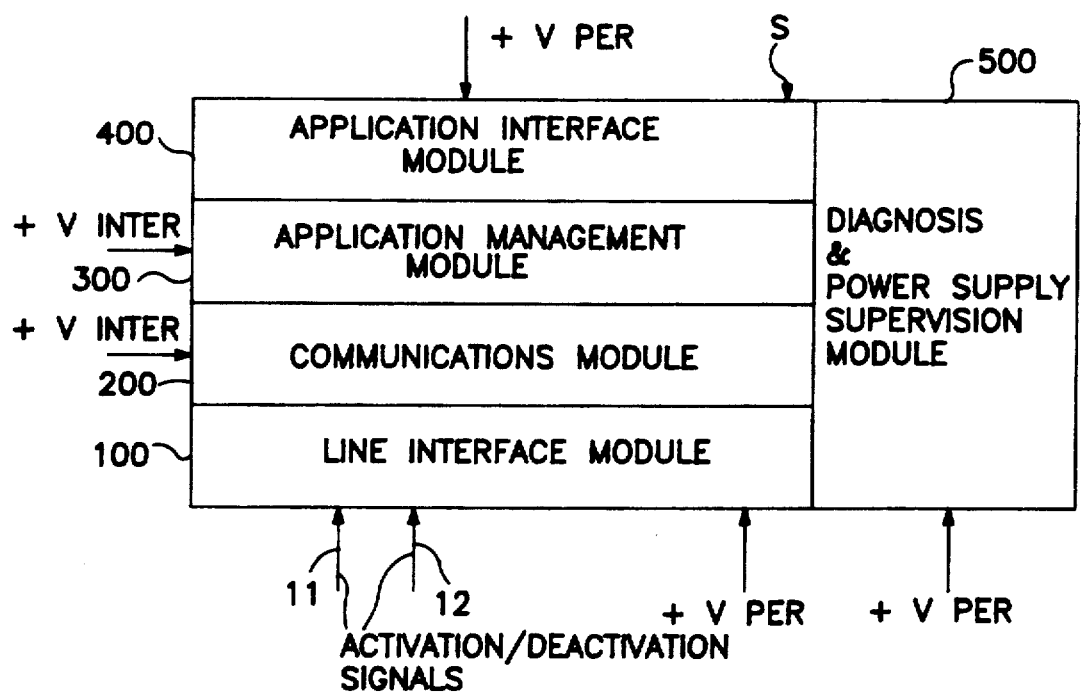
FIG. 2 is a functional block diagram showing the general structure of each station in the network.

As shown diagrammatically in FIG. 2, each station S essentially comprises five modules: a line interface module 100 connected to the bus 10; a communications module 200; an application management module 300; an application interface module 400; and a diagnosis and power supply supervision module 500.

The modules 100, 400, and 500 which are essential for "waking up" a station S remain permanently in operation, and to do this they are permanently supplied with power as shown diagrammatically in FIG. 2 by the reference +VPER.

In contrast, the modules 200 and 300 are only required for performing the function(s) associated with the station, and these modules are in operation only when the station is in the active state. To do this, the modules 200 and 300 are powered by interruptable power supply means represented in FIG. 2 by the reference +VINTER.

The line interface module 100 is known to the person skilled in the art and may be implemented in various different ways. The module 100 is preferably essentially constituted by a line matching RC type cell, a bandpass filter, and input/output amplifiers.

The communications module 200 may also be implemented in various different ways.

For example, it may be constituted by a system based on the dispositions described and shown in document FR-A-2578070.

Figure 3:
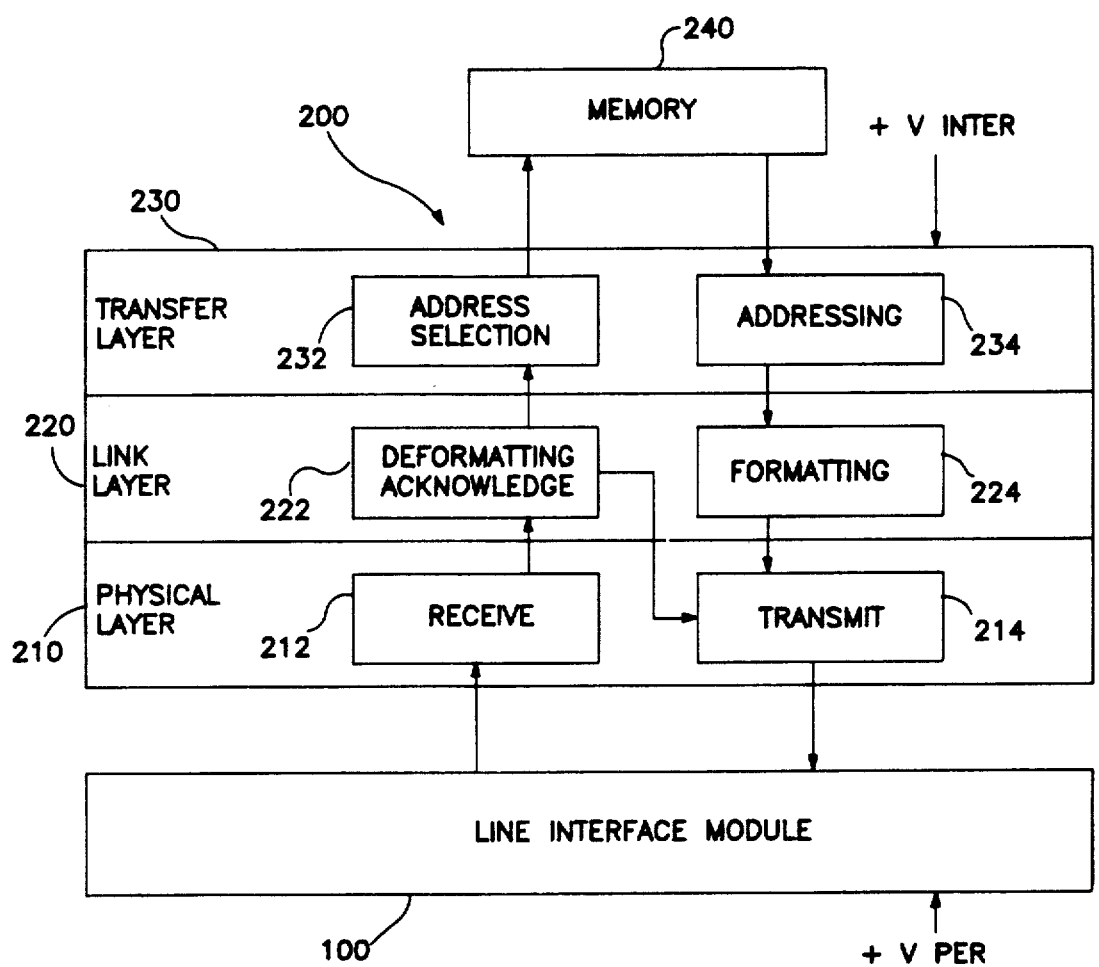
FIG. 3 is a functional block diagram showing the structure of a communications module integrated in each station.

Essentially, as shown diagrammatically in FIG. 3, such a module 200 comprises a physical layer 210, a link layer 220, and a transfer layer 230 associated with a memory 240. In the receive direction, the layers 210, 220, and 230 respectively constitute a receive module 212, a deformatting and acknowledgement module 222, and an address selection module 232. In the transmission direction, the layers 210, 220, and 230 respectively constitute a transmit module 214, a formatting module 224, and an addressing module 234.

The application management module 300 may essentially be comprised by a microprocessor associated in conventional manner with memory means.

The application interface module 400 may be constituted by any conventional means known to the person skilled in the art and is therefore not described in greater detail below.

Finally, the diagnosis and power supply supervision module 500 in the station is described in greater detail below with reference to the description of the "wake-up" process and the "putting to sleep" process.

More precisely, in a first embodiment of the invention each station suitable for performing a "wake-up" function comprises firstly means suitable for initiating local "waking up" of the station when the station is locally actuated by an operator, and means designed to initiate "waking up" of all of the stations in the network when any of the stations is activated by an operator, with the latter process being referred to as a remote "wake-up" process in the context of the present application.

In addition, a control station (or a plurality of control stations for increasing system reliability) also includes means for controlling the "putting to sleep" process. These means monitor activation of various network functions and control the "putting to sleep" of all of the stations.

In a second embodiment, each station initially includes means suitable for initiating local "wake-up" of the station when a given station is locally activated by an operator, and means designed to initiate the "waking up" of all of the stations in the network when any station is activated by an operator, with this latter process being referred to as a remote "wake up" process in the present application.

Each of the stations S1 to S4 also includes means for controlling its "putting to sleep" process.

LOCAL "WAKE-UP" PROCESS

Figure 4:
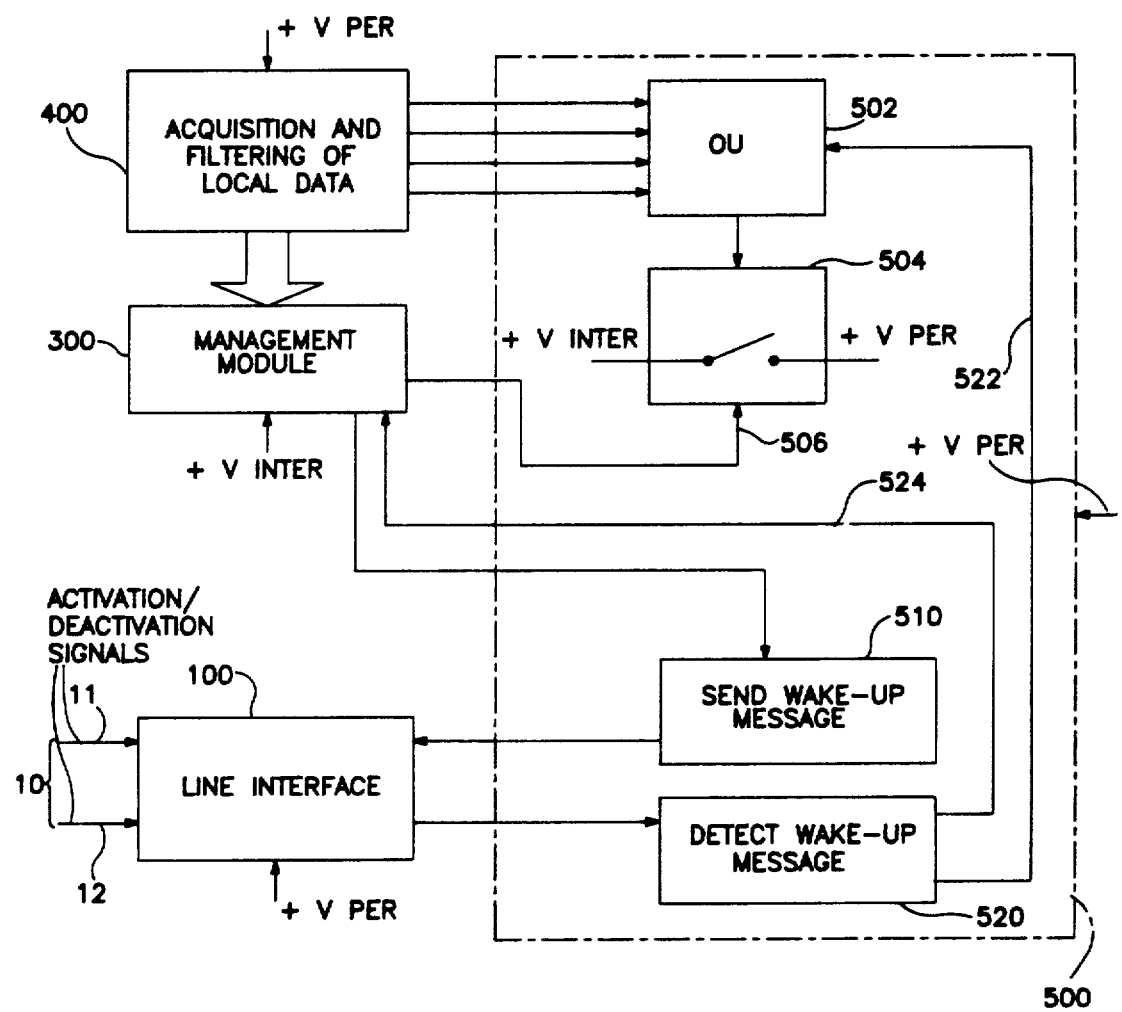
FIG. 4 is a functional block diagram of means integrated in each station for controlling the station "waking-up" process.

Accompanying FIG. 4 is a diagram showing the line interface module 100, the management module 300, the application interface module 400, and a station module in accordance with the present invention.

As mentioned above, in order to limit the power consumption of the network of stations when the engine is switched off, it is proposed that the power supply to all of the circuits in the station that are not indispensable for "waking" the station back up should be unpowered. In order to "wake up" a station, when the station is activated locally, a logic gate 502 is provided in the module 500, as shown in accompanying FIG. 4, with the inputs of the logic circuit 502 being connected to the interface module 400. Thus the output of the gate 502 is enabled when a request is made to activate at least one of the functions of the station under consideration. The output of the gate 502 controls a cell 504 for generating the interruptable power supply voltage +VINTER derived from the permanent power supply voltage +VPER.

For example, when a door is opened, a roof lamp contact is closed and this is detected by the application interface module 400, thereby leading to the output from logic gate 502 being enabled and consequently causing the switch integrated in cell 504 to be closed. At this stage, the application management module 300 and the communications module 200 which were previously in the dormant state switch to the active state.

The management module 300 then verifies that a function associated with its station is indeed being requested. If so, the management module 300 locks the interruptable power supply cell 504 in the closed state by means of link 506. Otherwise, if the management module 300 does not detect a request for a function associated therewith within a given time delay, the module 300 causes the interruptable power supply cell 504 to switch to the open state. This determined time delay is monitored by an auxiliary timer which is initialized when the output from the logic gate 502 is enabled.

REMOTE "WAKE-UP" PROCESS

In addition, when any one station of the network is activated as described above by a function associated therewith being requested, all of the stations of the network are "woken up" by the following process.

As shown in accompanying FIG. 4, the module 500 in each station further includes a cell 510 for sending a wake-up message under the control of the management module 300 and connected to the line interface 100, and a cell 520 for detecting a wake-up message and having its input connected to the line interface 100 and its output connected to one of the inputs of the logic gate 502.

When the management module 300 switches from the dormant state to the active state, it causes the cell 510 to send a "wake-up" message. This message is then conveyed via the line interface 100 to the communications bus 10, and is received by all of the other stations S1 to S4. The line interfaces 100 therein direct the received "wake-up" message to the detection cells 520 in their respective modules 500. When the detection cells 520 detect the arrival of a remote "wake-up" message, they enable the output of the logic gate 502 via link 522, thereby causing the interruptable power supply +VINTER to be switched on. Then, the management module 300 which is now under power is informed by the detection cell 520 via the link 524 so as to cause the cell 504 to be locked ON via the link 506 as described above, and should the module 300 detect a request for a function associated with this station within a determined time period. This period is monitored by the auxiliary timer integrated in the station, which timer is initialized when the output of the logic gate 502 is enabled, as described above in the context of the local "wake-up" process.

The above-described local "wake-up" process is thus triggered on a station by one of the inputs thereto changing state, whereas the remote "wake-up" process is triggered by another station transmitting a remote "wake-up" message over the bus 10.

FIRST EMBODIMENT: CENTRALIZED "PUTTING TO SLEEP" PROCESS

In the centralized "putting to sleep" process proposed by the present invention, a "control" station monitors the activation requests that are made to all of the "wake-up" functions that may be performed by the network, and it causes all of the stations to be "put to sleep" when no request is being made for any of the "wake-up" functions of the network.

More precisely, in this context, two types of "wake-up" function are distinguished. Functions of the first type are functions of unlimited duration, i.e. functions that require an operator to activate them and that require an operator to deactivate them.

Functions of the second type are limited duration functions, i.e. functions that require an operator to activate them, but which are designed to be deactivated automatically.

The five following functions may be mentioned as examples of first type or unlimited duration functions: using the ignition key to switch on the positive battery lead; switching on signal lamps and lighting lamps, side lights, dipped headlights, or headlights; switching or horns; switching on warning lights; and switching on roof lights. The following functions may be mentioned as examples of second type or limited duration functions: remote control; locking or unlocking by key or by switch.

The communications modules 200 are designed to generate the following on the communications bus 10 via their interface modules 100:

a first type of activation signal when a previously inactive unlimited duration wake-up function of the first type is requested by an operator;

a deactivation signal when a previously active wake-up function of the first type is to be deactivated; and a second type of activation signal when a previously inactive limited duration wake-up function of the second type is requested by the operator.

Figure 5:
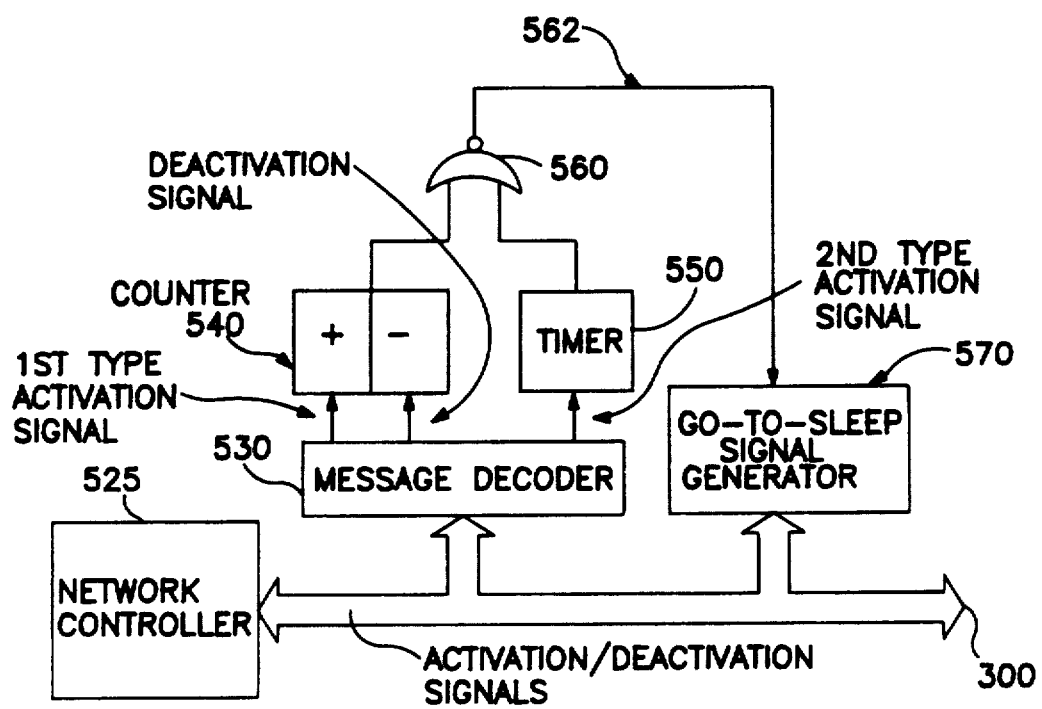
FIG. 5 shows a first embodiment including means integrated in one station for controlling the process whereby all of the stations are "put to sleep"

As shown in FIG. 5, the station managing the centralized "putting to sleep" process comprises, in its module 500: a message decoder cell 530; a counter 540, a timer 550, a logic gate 560, and a cell 570 for generating a centralized "go to sleep" message.

The message decoder 530 is connected to the line interface 100 via a network controller 525.

When the message decoder 530 detects an activation message of the first type it increments the counter 540 by one step. When the message decoder 530 detects a deactivation signal, it decrements the counter 540 by one step. Finally, when the message decoder 530 detects an activation signal of the second type, it initialized the timer 550.

The logic gate 560 has one input receiving the output from the counter 540 and another input receiving the output from the timer 550.

The output 562 from the logic gate 560 is connected to the input of the cell 570. The output 562 of logic gate 560 is enabled when simultaneously the counter 540 is at zero and the timer is not timing. This means that all "wake-up" functions are inactive.

The cell 570 can then generate a centralized "go to sleep" message which passes via the network controller 525 and the line interface module 100 to reach all of the stations S1 to S4 in the network. Naturally, it is possible to provide a single station in the network whose sole function is to monitor the control of the centralized "go to sleep" function. Alternatively, the control of this process may be assigned to any of the stations while allowing that station to perform other functions as well.

When a centralized "go to sleep" message is received by a station, the corresponding management module 300 causes the cell 504 controlling the interruptable power supply +VINTER to open. The corresponding stations thus switch to the dormant state as mentioned above.

It is preferable to provide the control station with a control timer (which may be constituted by the timer referred to above as the auxiliary timer) for the purpose of preventing a "go to sleep" message being generated before a determined time has elapsed after the stations have been "woken up", regardless of whether they are "woken up" by a local "wake-up" process or by a remote "wake-up" process. This control timer may be initialized when the output of the logic gate 502 of the control station is enabled. The same control timer 580 may also be designed to be initialized when the output of logic gate 560 is enabled as shown on FIG. 5b so as to prevent a "go to sleep" message being generated until a determined length of time has elapsed after said output is enabled.

Where appropriate, provision may be made such that regardless of the type of "wake-up" function implemented at a station, a request for that function causes an activation signal to be generated, while a deactivation signal is generated automatically when the function has completed its task.

In this case, the timer 500 shown in FIG. 5 and described above becomes pointless.

SECOND EMBODIMENT: DISTRIBUTED "PUTTING TO SLEEP" PROCESS

In the distributed "putting to sleep" process of the present invention, each station monitors requests for the functions associated therewith.

As for the first embodiment, the functions are not all treated in the same way.

More precisely, in this context, two types of "wake-up" function are distinguished. Functions of the first type are functions of unlimited duration, i.e. functions that require an operator to activate them and that require an operator to deactivate them.

Functions of the second type are limited duration functions, i.e. functions that require an operator to activate them, but which are designed to be deactivated automatically.

The five following functions may be mentioned as examples of first type or unlimited duration functions:

using the ignition key to switch on the positive battery lead; switching on signal lamps and lighting lamps, side lights, dipped headlights, or headlights; switching on horns; switching on warning lights; and switching on roof lights. The following functions may be mentioned as examples of second type or limited duration functions: remote control; locking or unlocking by key or by switch.

Each station S1 to S4 is designed to generate internally:

an activation siganl of a first type when a previously inactive unlimited duration function of the first type is requested of this station by the operator;

a deactivation signal when a previously active function of the first type of the station is to be deactivated; and a second type of activation signal when a previously inactive limited duration function of the second type is requested of the station by the operator.

Figure 6:
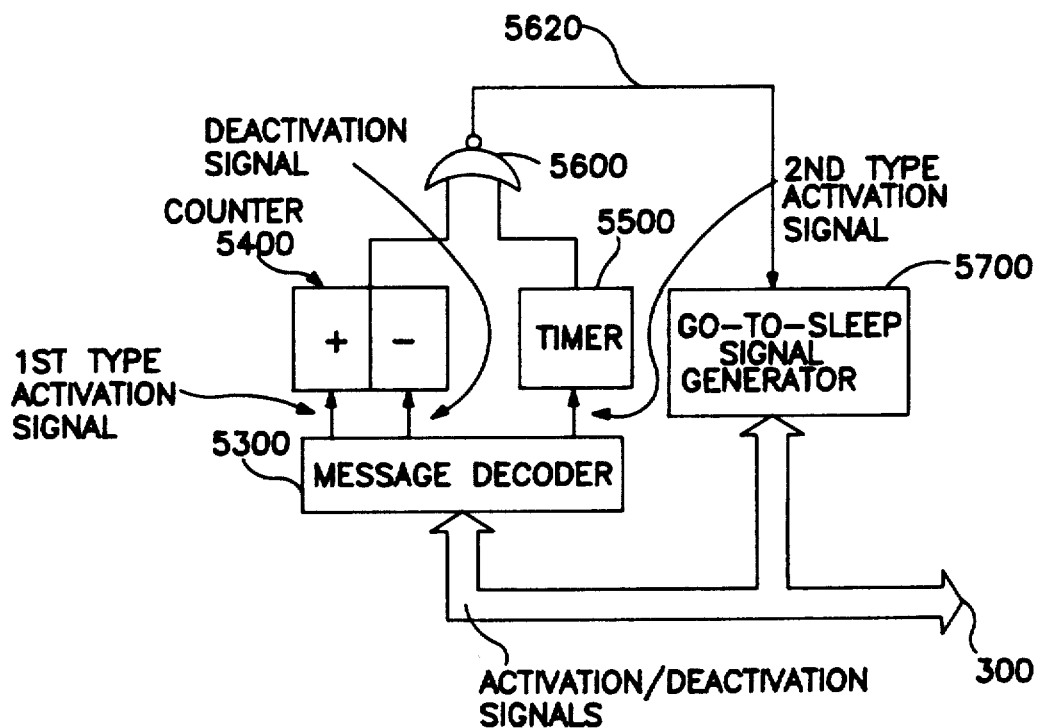
FIG. 6 shows a second embodiment including means integrated in each station for controlling the process whereby each station is "put to sleep".

As shown in FIG. 6, the module 500 of each station comprises a cell 5300 constituting a decoder of activation and deactivation signals, a counter 5400, a timer 5500, a logic gate 5600 and a "go to sleep" signal generator cell 5700.

The signal decoder 5300 receives the activation and deactivation signals generated by the station.

When the signal decoder 5300 detects an activation signal of the first type, it increments the counter 5400 by one step. When the signal decoder 5300 detects a deactivation signal, it decrements the counter 5400 by one step. Finally, when the signal decoder 5300 detects an activation signal of the second type, it initializes the timer 5500.

The logic gate 5600 has inputs receiving firstly the output from the counter 5400 and secondly the output from the timer 5500.

The output 5620 from logic gate 5600 is connected to the input of cell 5700. The output 5620 of logic gate 5600 is enabled when both the counter 5400 is at zero and simultaneously the timer is not timing. This means that none of the functions of the station is activated.

The cell 5700 can then generate a "go to sleep" signal which causes the corresponding station to switch from its active state to its dormant state.

Thus, when a "go to sleep" message is generated by a station, its control module 300 causes the cell 504 controlling the interruptible power supply +VINTER to open.

Each station is preferably provided with a control timer (which may correspond to the timer referred to previously as the auxiliary timer) to prevent the "go to sleep" signal being generated until a determined period of time has elapsed following the "waking up" of the station, regardless of whether the station is "woken up" by a local "wake-up" process or by a remote "wake-up" process. This control timer is initialized when the output of logic gate 502 is enabled. The same control timer 5800 may also be designed to be initialized when the output of logic gate 5600 is enabled or shown on FIG. 6b thereby making it possible to prevent the "go to sleep" signal being generated until a determined time period has elapsed after said output is enabled.

Where appropriate, provision may be made such that whatever type of function is implemented in a station, a request for the function causes an activation signal to be generated, while a deactivation signal is generated automatically when the function has been completed.

In this case, the timer 5500 shown in FIG. 6 and described above becomes pointless.

The present invention includes the following advantageous features, inter alia:

if a "go to sleep" message is sent simultaneously with a local function being activated (e.g. a "wake-up" function), the power supply to the corresponding station is switched off and on again after a determined time delay, e.g. of the order of 5 ms;

the modules 500 also include diagnosis means suitable for monitoring the state of each of the loads associated with a given station. For example, it may monitor the state of bulb filaments;

"wake-up" messages and "go to sleep" messages travelling over the communications bus 10 are not addressed, i.e. they are intended for all of the stations S1 to S4 connected to the bus 10. In contrast, other messages travelling over the same bus 10 and intended, for example, to cause a particular function to be switched on at a given station, are addressed, i.e. they include an address portion so that only the appropriate station or stations is/are activated;

when a message other than a "wake-up" message or a "go to sleep" message is sent over the communications bus 10, then such an "information" message should be preceded by a remote "wake-up" message in order to make sure that the destination station for the message is "awake";

the above-mentioned "activation" signals may be constituted by the "wake-up" messages themselves or by different signals; and each station may include a voltage-dropping module so that the voltage +VINTER and the voltage +VPER are different from the battery voltage of the motor vehicle.

Naturally, the present invention is not limited to the particular embodiments described above, but extends to any variant falling within the scope of the claims.

I claim:

1. A method of controlling a network of electronic stations in a motor vehicle each suitable for generating at least one function, the method comprising the following steps:
   i) generating an activation signal at at least one of the stations when a request is made for a previously inactive function;
   ii) generating a deactivation signal at the same station when a previously active function is to be deactivated;
   iii) detecting the generated activation and deactivation signals;
   iv) incrementing at least one counter by one step each time an activation signal associated with the counter is detected;
   v) decrementing the same counter by one step each time an associated deactivation signal is detected; and
   vi) generating a "go to sleep" signal whenever a counter reaches a zero count on being decremented.

2. A method according to claim 1, comprising the following steps at each station:
   i) generating an activation signal when a previously inactive function of the station is requested;
   ii) generating a deactivation signal when a previously active function of the station is to be deactivated;
   iii) detecting the activation and deactivation signals generated by said station;
   iv) incrementing a counter incorporated in the station by one step each time an activation signal generated by said station is detected;
   v) decrementing the same counter by one step each time a deactivation signal generated by said station is detected; and
   vi) generating a "go to sleep" signal for said station when the counter reaches a count of zero on being decremented.

3. A method according to claim 2, further including a step of preventing a "go to sleep" signal being generated until after a determined time period has elapsed after the associated station has been "woken up".

4. A method according to claim 2, further including a step of preventing a "go to sleep" signal being generated until after a determined time period has elapsed after the counter has decremented to the zero state.

5. A method of controlling a network of electronic stations in a motor vehicle each suitable for generating at least one function, said method for a network of electronic stations in which at least some of the functions generated by the electronic stations are "wake-up" functions, the method comprising the following steps:
   a) at at least some of the stations:
      i) generating an activation signal when a previously inactive "wake-up" function is requested;
      ii) generating a deactivation signal when an associated and previously active "wake-up" function is to be deactivated;
   b) at at least a first control station including a counter:
      i) detecting the activation and deactivation signals generated by all of the stations;
      ii) incrementing the counter by one step each time an activation signal is detected;
      iii) decrementing the same counter by one step each time a deactivation signal is detected; and
      iv) generating a "go to sleep" signal for all of the stations when the counter reaches a count of zero on being decremented.

6. A method according to claim 5, further including a step of preventing a "go to sleep" signal being generated until after a determined time period has elapsed after the stations have been "woken up".

7. A method according to claim 5, further including a step of preventing a "go to sleep" signal being generated until after a determined time period has elapsed after the counter has decremented to the zero state.

8. A method for controlling a network of electronic stations in a motor vehicle, said electronic stations suitable for generating at least one "wake-up" function of a first type which requires an operator to activate it and an operator to deactivate it, and at least one "wake-up" function of a second type which is of limited duration and which requires an operator to activate it, but which is designed to be deactivated automatically, the method comprising the following steps:
   a) at at least some of the stations:
      i) generating an activation signal of a first type when an associated and previously inactive "wake-up" function of the first type is requested by the operator;
      ii) generating a deactivation signal when an associated and previously active "wake-up" function of the first type is to be deactivated;
      iii) generating an activation signal of a second type when an associated and previously inactive limited duration "wake-up" function of the second type is requested by the operator;

b) and at at least a first control station including a counter and a timer:
  i) detecting the activation and deactivation signals generated by all of the stations;
  ii) incrementing the counter by one step each time an activation signal is detected;
  iii) decrementing the same counter by one step each time a deactivation signal is detected; and
  iv) initializing the timer each time an activation signal of the second type is detected; and
  v) generating a "go to sleep" signal for all of the stations when the counter reaches a count of zero and simultaneously the timer is not timing.

9. A method according to claim 8, further including a step of preventing a "go to sleep" signal being generated until after a determined time period has elapsed after detecting that the timer has reached a stable state in association with the counter being at a count of zero.

10. A method of controlling a network of electronic stations in a motor vehicle each suitable for generating at least one function, said method for a network of electronic stations in which at least some of the stations are suitable for generating at least one function of a first type and which requires an operator to activate it and an operator to deactivate it, and at least one function of a second type which is of limited duration and which requires an operator to activate it, but which is designed to be deactivated automatically, the method comprising the following steps at each of the stations:
  generating an activation signal of a first type when a previously inactive function of the first type of the station is requested by the operator;
  generating a deactivation signal when a previously active function of the first type of said station is to be deactivated;
  generating an activation signal of a second type when a previously inactive limited duration function of the second type of the station is requested by the operator;
  detecting the activation and deactivation signals generated by said station;
  incrementing the counter incorporated in aid station by one step each time an activation signal of the first type generated by said station is detected;
  decrementing the same counter by one step each time a deactivation signal generated by said station is detected;
  initializing a timer incorporated in said station each time an activation signal of the second type generated by said station is detected; and
  generating a "go to sleep" signal for said station whenever the counter reaches a count of zero and simultaneously the timer is not timing.

11. A method according to claim 10, further including a step of preventing a "go to sleep" signal being generated until after a determined time period has elapsed after detecting that the timer has reached a stable state is association with the counter being at a count of zero.

12. A network of electronic stations in a motor vehicle each suitable for generating at least one function, the network comprising:
  means suitable for generating an activation signal when an associated and previously inactive function is requested;
  means suitable for generating a deactivation signal when an associated and previously active function is to be deactivated;
  means suitable for detecting the generated activation and deactivation signals;
  a counter designed to be incremented by one step each time an associated activation signal is detected and to be decremented by one step each time an associated deactivation signal is detected; and
  means suitable for generating a "go to sleep" signal each time a counter reaches a zero count on being decremented.

13. A network according to claim 12, comprising the following at each station:
  said means suitable for generating an activation signal when a previously inactive function of the station is requested;
  said means suitable for generating a deactivation signal when a previously active function of said station is to be deactivated;
  means designed to detect the activation and deactivation signals generated by said station;
  said counter designed to be incremented by one step each time an activation signal is detected and to be decremented by one step each time a deactivation signal is detected; and
  said means suitable for generating a "go to sleep" signal for said station whenever the counter reaches a zero state on being decremented.

14. A network according to claim 13, wherein the various stations of the network are interconnected by a transmission bus.

15. A network according to claim 13, wherein each station further includes means suitable for monitoring the state of the associated loads.

16. A network according to claim 13, wherein each station further includes an auxiliary timer designed to be initialized when the associated station is "woken up" in order to prevent a "go to sleep" signal being generated before a determined time period has elapsed after "waking up".

17. A network according to claim 13, wherein each station further includes an auxiliary timer designed to be initialized when the counter reaches a zero count in order to prevent a "go to sleep" signal being generated before a determined time period has elapsed following said state being reached.

18. A network of electronic stations in a motor vehicle each suitable for generating at least one function, comprising:
  a) at at least some of the stations:
    means suitable for generating an activation signal when an associated and previously inactive "wake-up" function is requested;
    means suitable for generating a deactivation signal when an associated and previously active "wake-up" function is to be deactivated;
  b) at at least a first control station:
    means suitable for detecting the activation and deactivation signals generated by all of the stations;
    a counter designed to be incremented by one step each time an activation signal is detected and to be decremented by one step each time a deactivation signal is detected; and
    means suitable for generating a "go to sleep" signal for all of the stations when the counter reaches a zero count on being decremented.

19. A network according to claim 18, wherein the various stations of the network are interconnected by a transmission bus, and only one of the stations in the network includes a counter.

20. A network according to claim 18, wherein each station further includes means suitable for monitoring the state of the associated loads.

21. A network according to claim 18, wherein the control station further includes an auxiliary timer designed to be initialized when the stations are "woken up" in order to prevent a "go to sleep" signal being generated before a determined time period has elapsed after "waking up".

22. A network according to claim 18, wherein the control station further includes an auxiliary timer designed to be initialized whenever the counter reaches a zero count in order to prevent the "go to sleep" signal being generated until after a determined time period has elapsed following said state being reached.

23. A network of electronic stations in a motor vehicle each suitable for generating at least one function, said stations suitable for generating at least one "wake-up" function of a first type which requires an operator to activate it and an operator to deactivate it, and at least one "wake-up" function of a second type which is of limited duration and which requires an operator to activate it, but which is designed to be deactivated automatically, the network comprising:

a) at at least some of the stations:
   means suitable for generating an activation signal of a first type whenever an associated and previously inactive "wake-up" function of the first type is requested by an operator;
   means suitable for generating a deactivation signal whenever an associated and previously active "wake-up" function of the first type is to be deactivated;
   means suitable for generating an activation signal of a second type whenever an associated and previously inactive limited duration "wake-up" function of the second type is requested by the operator;

b) at at least a first control station:
   means suitable for detecting the activation and the deactivation signals generated by all of the stations;
   a counter designed to be incremented by one step each time an activation signal of the first type is detected and to be decremented by one step each time a deactivation signal is detected;
   a timer designed to be initialized each time an activation signal of the second type is detected; and
   means suitable for generating a "go to sleep" signal for all of the stations whenever the counter reaches a zero count and simultaneously the timer is not timing.

24. A network according to claim 23, wherein the control station further includes an auxiliary timer designed to be initialized when the station detects that the timer has reached a stable state and there is a zero count in the counter.

25. A network of electronic stations in a motor vehicle each suitable for generating at least one function wherein the network comprises stations suitable for generating at least one function of a first type and which requires an operator to activate it and an operator to deactivate it, and at least one function of a second type which is of limited duration and which requires an operator to activate it, but which is designed to be deactivated automatically, the network comprising at each of its stations:

means suitable for generating an activation signal of a first type when a previously inactive function of the first type of said station is requested by the operator;

means suitable for generating a deactivation signal when a previously active function of the first type of said station is to be deactivated;

means suitable for generating an activation signal of the second type whenever a previously inactive limited duration function of the second type of said station is requested by the operator;

means suitable for detecting the activation and deactivation signals generated by said station;

a counter designed to be incremented by one step each time an activation signal of the first type generated by said station is detected and to be decremented by one step each time a deactivation signal generated by said station is detected;

a timer designed to be initialized each time an activation signal of the second type generated by said station is detected; and means suitable for generating a "go to sleep" signal for said station when the counter reaches a zero state and simultaneously the timer is not timing.

26. A network according to claim 25, wherein each station further includes an auxiliary timer designed to be initialized when the station detects that the timer has reached a stable state in association with a zero count in the counter.

* * * * *